United States Patent [19]
Houk

[11] 4,101,747
[45] Jul. 18, 1978

[54] DIFFERENTIAL PRESSURE OPERATED SWITCH

[75] Inventor: William J. Houk, Columbus, Ohio

[73] Assignee: Ranco Incorporated, Columbus, Ohio

[21] Appl. No.: 653,899

[22] Filed: Jan. 30, 1976

[51] Int. Cl.² .......................................... H01H 35/32
[52] U.S. Cl. .............................. 200/83 A; 200/83 Y; 200/83 C; 200/81 R; 92/103 SD
[58] Field of Search ............... 200/81 R, 83 A, 83 B, 200/83 C, 83 D, 83 S, 83 Y, 83 P, 83 N; 73/205 R, 209, 407 P, 407 PR, 410; 92/47, 92, 103 SD; 116/70, 117 R, DIG. 7

[56] References Cited

U.S. PATENT DOCUMENTS

| | | | |
|---|---|---|---|
| 2,092,955 | 9/1937 | Chamberlain | 200/83 C |
| 2,109,145 | 2/1938 | Farmer | 200/83 Y |
| 2,962,565 | 11/1960 | Schlicksupp | 200/835 |
| 3,330,925 | 7/1967 | Andrew et al. | 200/83 P |
| 3,472,037 | 10/1969 | Bucalo | 200/83 D |
| 3,827,828 | 8/1974 | Edwards | 200/83 B |
| 3,874,052 | 4/1975 | Schantz | 92/103 SD |

FOREIGN PATENT DOCUMENTS

1,029,910   5/1958   Fed. Rep. of Germany ..... 200/83 Y

*Primary Examiner*—Gerald P. Tolin
*Attorney, Agent, or Firm*—Watts, Hoffmann, Fisher & Heinke

[57] ABSTRACT

A pressure responsive control device including a housing, a control switch unit and switch operating actuator, and a controller unit is disclosed for controlling operation of a refrigeration defrosting device. The actuator includes a bladder formed of thin film material which changes volume when a differential fluid pressure exists across the bladder. The bladder and switch unit are such that bladder volume changes are accompanied by minimal losses thus enabling the controller unit to be enabled in response to extremely slight differential pressures.

10 Claims, 7 Drawing Figures

DIFFERENTIAL PRESSURE OPERATED SWITCH

BACKGROUND OF THE INVENTION

Field of the Invention

The present invention relates to condition responsive control devices or more particularly relates to control devices which are sensitive to extremely small levels of differential fluid pressure.

Control devices which respond to sensed differential fluid pressure changes are of various kinds and types. Such control devices have frequently included electrical switches, fluid flow controlling valves, or other such devices, operated by differential fluid pressure which evidences the existence of some physical condition.

There are a number of environments in which it is desirable to be able to sense extremely small differential fluid pressures and perform a control function. One example of such an environment is in a typical household refrigerator having a small fan for circulating air across air-chilling refrigeration coils. Moisture in the air tends to condense on the chilling coils and forms ice, or frost, which impedes the ability of the coils to chill the air and thus reduces the efficiency of the refrigerator. The efficiency of the refrigeration unit can be maximized by promptly sensing a build-up of ice or frost on the coils and "defrosting" the refrigerator.

The continued formation of ice or frost on the coils gradually restricts the flow rate of air across them and therefore the presence of ice on the coils is evidenced by a change in differential air pressure across the coils. Accordingly, detecting the differential pressure of the air flowing across refrigeration coils is one way of determining when the refrigerator should be defrosted. Control devices have been proposed for performing this function.

In environments of the character referred to the control device must be operated by forces produced by small differential pressures. In order to effectively respond to small differential pressures the control device must either be constructed so that the differential pressure is distributed over a relatively large area to produce a correspondingly large control operating force, or be capable of responding accurately and reliably to extremely small forces.

Generally speaking, control devices used in mass produced equipment, such as refrigerators, cannot be large because of space limitations in the equipment. Hence, control devices which rely on large pressure areas upon which small differential pressures act to exert actuating forces are not practical.

Reasonably small-sized control devices for sensing differential pressures have frequently utilized a flexible diaphragm across which differential pressure is established to impart operating force to the diaphragm. The diaphragms are usually constructed from a rubber or rubber-like plastic material and are secured in place along their outer peripheries. A plate or pad is generally secured to the diaphragm for transmitting actuating forces from the diaphragm to a control member, such as a valve or switch element. Prior art control devices employing diaphragm-type actuators are disclosed, for example, by U.S. Pat. Nos. 2,229,740 (issued to Helmore on Jan. 28, 1941); 3,066,496 (issued to Jokela on Dec. 4, 1962); 3,300,703 (issued to Gold, et al., on Jan. 24, 1967); and 3,359,388 (issued to Houser, et al., on Dec. 19, 1967).

Control devices employing inflatable actuators have also been proposed. These devices, in essence, have employed balloon-like actuator elements instead of diaphragms and the actuator elements have been resiliently expanded, by applied differential pressure, into engagement with movable control members. The control members in turn have performed control functions by sliding or pivoting movement imparted to them by the actuators. Prior art devices of this general type are disclosed, for example, in U.S. Pat. Nos. 1,942,040 (issued to Wolff on Jan. 22, 1934); 2,795,668 (issued to Pucket on June 11, 1957); and 3,247,341 (issued to Kizilos on Apr. 19, 1966).

Operation of these kinds of control devices by extremely small differential pressures (for example 0.05 inches of water or less which corresponds to 0.002 psi or less) has not been possible because of a number of problems. Firstly, the the mass of the diaphragm, plate and/or the associated components which must be moved during operation of the control device has been so great relative to the available force that such controls have lacked adequate sensitivity. Secondly, the existence of frictional losses in the devices has been relatively great (compared to the available forces). Thirdly, frictional losses have not been consistent from cycle to cycle thus reducing the accuracy and repeatability of the devices. Furthermore, many devices are position sensitive in that the differential pressure levels to which they respond change depending upon the positional orientation of the device (primarily because of the varying effects of gravity on the pressure responsive element and associated components). Still further, many prior art control devices have been constructed so that increasingly greater differential pressures are required to be sensed in order to supply enough force to complete a control function of the device.

The kinds of problems referred to have prevented the introduction of small, highly sensitive, relatively inexpensive control devices for general purpose use in mass produced appliances.

SUMMARY OF THE INVENTION

The present invention provides a new and improved differential fluid pressure responsive control device which is constructed and arranged to sense and respond reliably to extremely small differential pressures yet is compact, composed of relatively inexpensive readily available components and inexpensively manufactured.

According to a preferred embodiment of the invention, the new control device includes a support housing having a reaction face, a control member supported for movement relative to the reaction face and a differential pressure responsive actuator reacting between the face and the control member to move the control member.

The actuator includes a bladder formed of supple exceedingly thin film material and a conduit member for communicating the interior of the bladder with a source of fluid pressure which may vary relative to the fluid pressure ambient the bladder. The bladder volume changes in response to differential pressures between the source and ambient fluids and as the bladder volume expands the control member is engaged by the bladder. The differential pressure acts on the control member via the bladder wall resulting in the control member being moved to initiate a control function.

The bladder is preferably a flattenable bag-like structure having one major face extending along the reaction surface, an outer periphery which, at least for the most part, is unsupported by and freely movable with respect to the support housing, and a second major face which is engageable with the control member upon expansion of the bladder. The bladder volume is relatively large so that the bladder is expansible to move the control member to its limit of motion without any appreciable strentching of the film-like bladder material.

The bladder construction minimizes losses during inflation thus maximizing the accuracy and sensitivity of the control device to small differential pressures. The bladder material is a thin (e.g., 1 to 1.25 mils), low density, biaxially oriented film which is extremely supple. The pliability of the material is substantially temperature independent throughout the normal atmospheric temperature range (e.g., from −20 to 100° F). The material is static free in that it will not cling to itself as a result of the presence of static electric charge, and has a low coefficient of sliding friction of the control member. These characteristics assure that losses such as those due to friction in flexing the bladder, frictional resistance to relative motion between the bladder and the control member, and losses accompanying work done in expanding the bladder are very slight and substantially the same from cycle to cycle of the device.

The actuator conduit member secures the bladder in position to the housing without requiring substantial restraint of the bladder periphery relative to the housing. The conduit member and bladder are constructed for quick and easy assembly and are related to the housing so that leakage to or from the bladder is effectively prevented when the actuator is assembled to the housing.

The bladder and control member cooperate so that as the bladder expands, a force amplifying effect is achieved by virtue of the bladder contacting the control member over pressure areas which increase as the pressure differential increases. The control member is preferably formed by sheet material which presents a substantial area for engagement by the actuator. As the bladder inflates, one of its faces initially touches the control member along a small area. A small actuating pressure force is transmitted to the control member causing a slight movement of the control member. Further expansion of the bladder volume, resulting from an increase in sensed differential pressure, causes the bladder to engage the control member over an increasingly great area. This relationship results in increasingly greater actuating forces being applied to the control member over increasingly greater area even though the control member tends to move away from the bladder.

The control member is preferably formed of spring material and is cantilevered to the housing. The application of actuating force to the control member from the fluid pressure in the bladder is distributed over a substantial length of the control member. The applied force thus arcuately flexes the control member along an increasing portion of its extent as the bladder inflates and effectively amplifies the motion of the projecting control member end. The cantilevered support of the control member eliminates frictional losses which might otherwise be present if the control member were hinged to the housing.

The control member is formed with cutout portions so that the weight of the control member is minimized. The bladder is permitted to expand through the cutouts beyond the plane of the control member so that the tensile strength of the bladder material participates to some extent in moving the control member.

In a preferred embodiment of the invention the control device includes an electrical control switch unit and the control member forms a movable contact arm of the switch. The control member is secured at one end to the housing and projects along the bladder. As the bladder volume changes, the projecting end of the control member, which forms a switch contact, moves relative to the housing to open and close the switch.

The control member is associated with a second projecting resilient switch member which is constructed and arranged so that regardless of the mounting position of the control device, deflections of the switch members caused by gravity forces are consistent. Hence, the differential pressure level at which the control device is set to operate is not substantially affected by the orientation of the device.

The switch member is adjustably supported relative to the housing and a positioning mechanism for the switch member is provided which permits precise position adjustment of the second switch member relative to the control member. This in turn enables precise setting of the differential pressure levels to which the device responds.

Other features and advantages of the invention will become apparent from the following detailed description of a preferred embodiment made with reference to the accompanying drawings.

DESCRIPTION OF A PREFERRED EMBODIMENT

Figure 1:
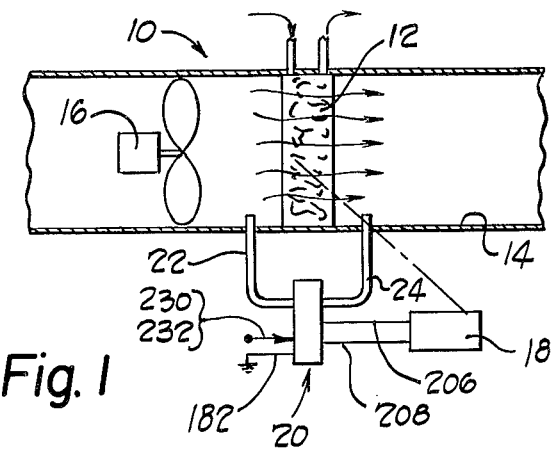
FIG. 1 is a schematic illustration of a portion of a refrigeration system embodying the present invention.

A portion of a refrigeration system 10 embodying the invention is illustrated by FIG. 1 of the drawings and includes a refrigeration coil 12 stationed in a duct, or passage, 14 through which air is circulated by a fan 16, a defroster 18 for moving ice or frost from the coil 12 and a control device 20 for initiating operation of the defroster.

The refrigeration unit 10 can be of any suitable construction but for the purpose of this description it will be assumed that the refrigeration system includes a compressor/condenser/evaporator-type mechanical refrigeration unit and that the refrigeration coil 12 is formed by the evaporator of the unit. Typical refrigeration coils are formed by a serpentine heating-conducting metal tube through which refrigerant flows. The tube is maintained well below the freezing temperature of water by the circulating refrigerant. As air circulates across the coil the air is chilled and moisture in the air condenses on the cold surface of the coil. The condensed moisture freezes and after a time ice or frost accumulates on the coils and reduces the efficiency of the refrigeration unit.

As the ice or frost builds up on the coil 12, the flow of air across the coil is impeded. Impeding the flow of air across the coil 12 causes the air pressure in the duct upstream from the coil to increase above the duct air pressure downstream from the coil. The extent of the differential pressure across the coil is a measure of the amount of ice or frost present on the coil.

The control device 20 is a differential pressure responsive control device which is in pressure communication with air upstream and downstream from the coil 12 via pressure transmitting lines 22, 24. When sufficient ice or frost accumulates on the heat exchanger 12 the resultant differential pressure detected by the device 20 causes the device 20 to initiate operation of the defroster 18. When defrosting is concluded another suitable device, such as a thermostat, terminates operation of the defroster.

The defroster 18 may be of any suitable or conventional construction, such as a refrigerant flow reversing valve and associated components, and is not illustrated or described in detail here. Suffice it to say that the defroster is constructed and arranged so that its operation is initiated electrically.

Figure 2:
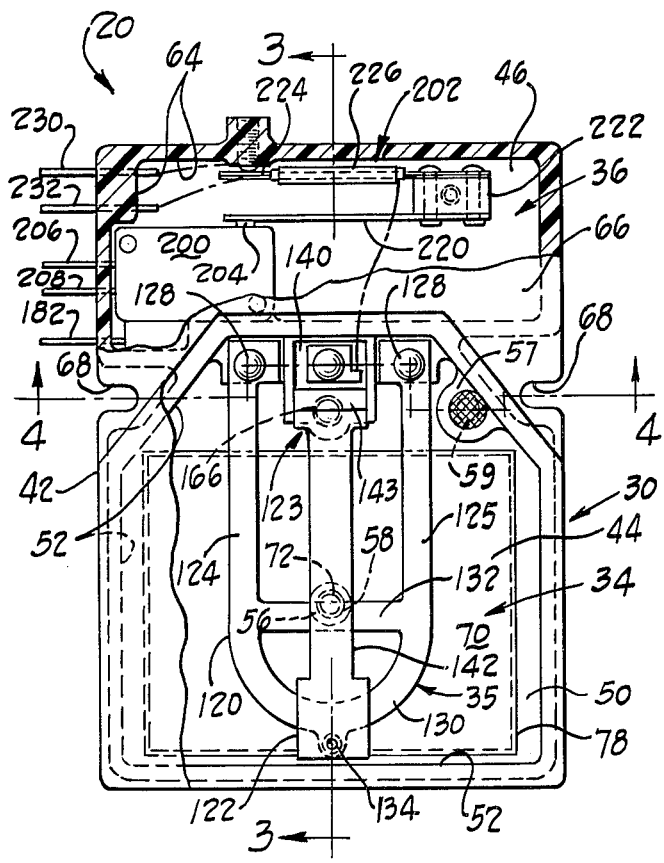
FIG. 2 is an elevational view of a control device embodying the present invention having portions broken away and portions illustrated in cross-section.
Figure 3:
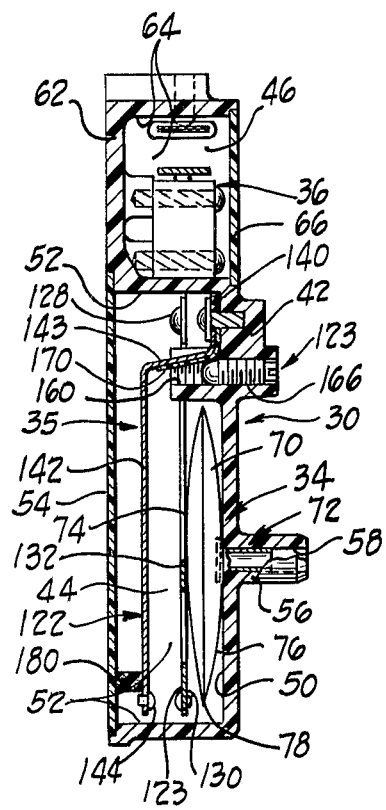
FIG. 3 is a cross-sectional view of the device illustrated by FIG. 2 seen approximately from the plane indicated by the line 3—3 of FIG. 2.
Figure 4:
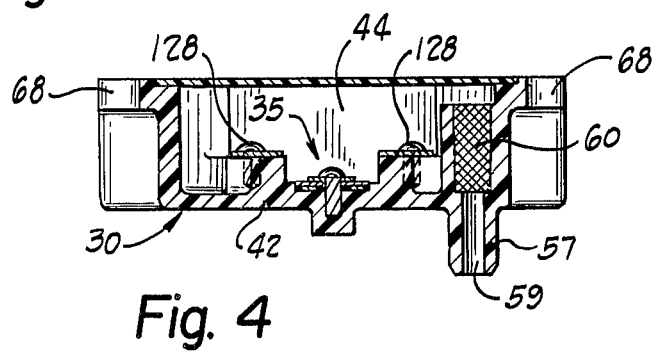
FIG. 4 is a cross-sectional view of the device of FIG. 2 seen approximately from planes indicated by the line 4—4 of FIG. 2.

One preferred construction of the control device 20 is illustrated by FIGS. 2-4 of the drawings and comprises a housing assembly 30 supporting a differential pressure responsive actuator 34 and associated control switch unit 35, and a defroster controller unit 36. The actuator 34 actuates the control switch 35 in response to the existance of a predetermined low-level differential pressure across the refrigeration coil 12. The control switch 35 is thus actuated when a predetermined amount of frost or ice is sensed on the coil 12 an in turn operates the defroster controller 36. The defroster controller responds to operation of the switch unit 35 by initiating operation of the defroster 18.

The housing assembly 30 supports the actuator 34 and control switch unit 35 in one housing chamber and the controller 36 in a second housing chamber, the housing chambers being sealed from each other and electrically isolated. The assembly 30 preferably includes a housing body 42 molded from a dimensionally stable, high dielectric plastic material (e.g., Bakelite) and which defines oppositely facing recesses 44, 46. The recess 44 is defined by a reaction surface 50 and a peripherally extending wall 52 disposed about the surface 50. Molded pressure tops 56, 57 project from the housing body 42 and define respective passages 58, 59 by which air pressure is communicated to the recess 44 via the lines 22, 24, respectively. In the illustrated embodiment of the invention a conventional air filter element 60 is disposed in the passage 59 to prevent particulate matter from entering the recess 44.

The actuator 34 and the switch unit 35 are assembled to the housing body in the recess 44 and a plastic cover plate 54 is sealed in place over the open side of the recess remote from the surface 50.

The recess 46 is formed by a base wall portion 62 and a peripheral wall 64 which extends about the base wall 62. The controller 36 is assembled in the recess 46 and the recess is closed by a dielectric plastic cover plate 66.

The illustrated housing body 42 is provided with mounting slots 68 which receive headed mounting screws or the like (not shown) for clamping the control device in a desired mounting location.

The actuator 34 operates the switch unit 35 in response to extremely low-level, sensed differential pressures and in the preferred embodiment of the invention is formed by an inflatable bladder 70 and an associated conduit member 72 connecting the bladder 70 to the housing assembly 30. The bladder 70 is a flattenable bag-like element formed by a pair of rectangular bladder wall forming sheets 74, 76 of film material which are heat sealed together along a rectagular peripheral edge 78. The edge 78 is disposed within the housing assembly 30 and unrestrained against motion relative to the housing assembly.

Figure 7:
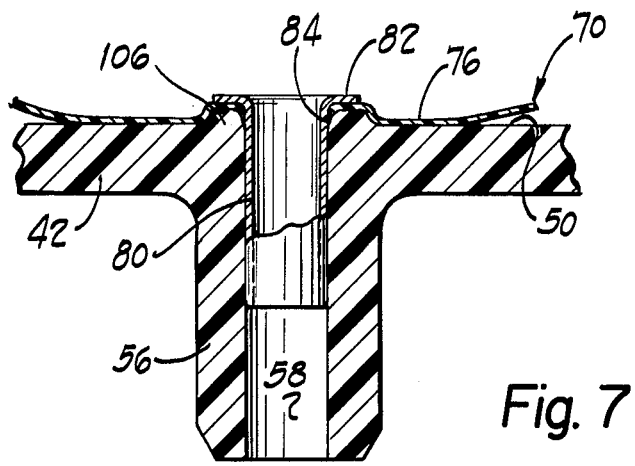

The conduit member 72 anchors the bladder 70 to the housing assembly 30 without effectively constraining the bladder for any particular motion relative to the housing and also communicates the interior of the bladder to the air pressure on the upstream side of the refrigeration coil. In the preferred embodiment of the invention the conduit member 72 includes a tubular cylindrical body 80 and an enlarged flange-like head 82 (See FIG. 7). The head 82 is disposed within the bladder 70 and the body 80 projects through a circular aperture 84 in the bladder wall 76. The aperture 84 has a substantially smaller diameter than the head 82 and the conduit member 72 and bladder are assembled together by inserting the head 82 through the aperture 84 much like passing a button through a buttonhole.

When the conduit member 72 is assembled to the bladder the aperture 84 may resiliently grip the periphery of the body 80 to form a seal between the bladder and the conduit member. The body projects into and frictionally grips the passageway 58 in the tap 56 and the material of the sheet 76 is interposed and gripped between the head 82 and a lip 106 formed on the reaction surface 50 peripherally about the passage 58.

Since the housing chamber ambient the bladder 70 is communicated to the duct 14 downstream from the refrigeration coil 12 and the interior of the bladder 70 is communicated to the duct 14 upstream from the coil, resistance to air flow across the refrigeration coil causes the pressure within the bladder to exceed the pressure ambient the bladder and the bladder inflates.

The bladder is interposed between the reaction surface 50 and the switch unit 35 and as it inflates it reacts between the surface 50 and the switch unit 35 to actuate the switch unit. The switch unit 35 includes a control member 120 actuable by the actuator 34, a contact member 122 which is engaged by the member 120 for rendering the switch unit conductive and an adjusting mechanism 123 for the contact member 122. The control member 120 is engaged by the inflating bladder and is moved toward the contact member 122 until, at a predetermined sensed differential pressure level, the members 120, 122 are in contact thus "closing" the switch unit 35. The adjusting mechanism 123 positions the contact member 122 to govern the differential pressure level at which the members 120, 122 engage.

The control member 120 is preferably formed by a thin sheet of berylium copper spring material having cutout portions which define parallel mounting legs 124, 125 which are respectively attached to the housing body 122 by fasteners 128. A circularly curved end portion 130 extends between the projecting ends of the legs 124, 125 and a lateral strut 132 connects the mounting legs at a location between their ends. A switch contact element 134 is secured to the end portion 130.

The control member 120 has an undeflected position in which it projects from its connection to the housing assembly 30 generally parallel to the reaction surface 50. As the member 120 is engaged by the bladder 70 to legs 124, 125 are resiliently deflected by the applied differential pressure force so that the contact element 134 is moved toward the contact member 122. The degree of deflection of the legs 124, 125 is a direct function of the level of differential pressure sensed by the bladder 70. The member 120 is self-biased to its undeflected position so that it resists movement by the bladder 70.

The construction of the control member 120 and the bladder 70 and their coaction contributes substantially to the ability of the device 20 to sense and respond to differential pressures as small as 0.02 inches of water (about 0.00072 psi). In particular, the actuator 34 and the control member 120 are constructed to maximize the efficiency with which the switching unit 35 is operated by the actuator 34. The preferred bladder material is a biaxially oriented ethylene vinyl acetate copolymer which is extremely limp or pliant at least at ambient temperatures ranging from −20° F to 100° F. The suppleness of the bladder material is such that the bladder has virtually no structural strength except in tension (the material is in tension, for example, when the bladder is inflated against some resistance). When the bladder is inflated the peripheral edge 78 buckless as the bladder walls 74, 76 move away from each other and buckling also occurs in the bladder walls 74, 76 along the edge 78. Because of its limpness, pliability and slight wall thickness (1–1.25 mils) the bladder buckles and bends while expanding without incurring any significant energy losses attributable to deformation of the bladder.

The bladder material is also "static free" in that it will not cling to itself as a result of static electrical charges on the bladder faces. This is important because the faces of the bladder are easily separated during inflation without requiring work or energy losses attendant overcoming attractive static forces acting on the bladder.

The bladder material likewise has a low coefficient of sliding friction when engaged with the control member 120 and the reaction surface 50. This permits the materials to slide readily relative to one another during inflation of the bladder without significant losses.

The cantilevered connection of the member 120 to the housing body 42 permits resilient deflecting movement of the member relative to the housing with minimal frictional losses associated with displacement of the member.

The bladder 70 and control member 120 are constructed to minimize their weights thus enabling greater sensitivity to small actuating forces. The rectangular bladder 70 is preferably about 2 inches long by 1½ inches wide with the wall thickness of the bladder material being, as noted above, on the order of 0.001 inches. Hence the inflation of the bladder and the attendant shifting of the center of gravity of the bladder does not require significant force or work. The sheet material forming the control member 120 is formed to provide large area openings between the mounting legs which reduces the weight of the member. The thickness of the preferred control member is about 0.008 inches which minimizes the member weight yet assures adequate structural strength.

The relationship of the bladder 70 and the control member 120 also provides for a pressure force amplification effect which is achieved during actuation of the switch unit 35.

The bladder volume is such that if the control member 120 were not present in the housing assembly the bladder 70 could expand through the space occupied by the member 120 before the applied differential pressure created tension in the bladder walls. Therefore expansion of the bladder 70 to a volume which is sufficient to close the switch unit 35 can occur without the bladder walls being stressed. The bladder may thus be thought of as more or less "slack" during actuation of the control member 120 because the only tension in the bladder walls is that due to resilient engagement with the member 120.

Figure 5:
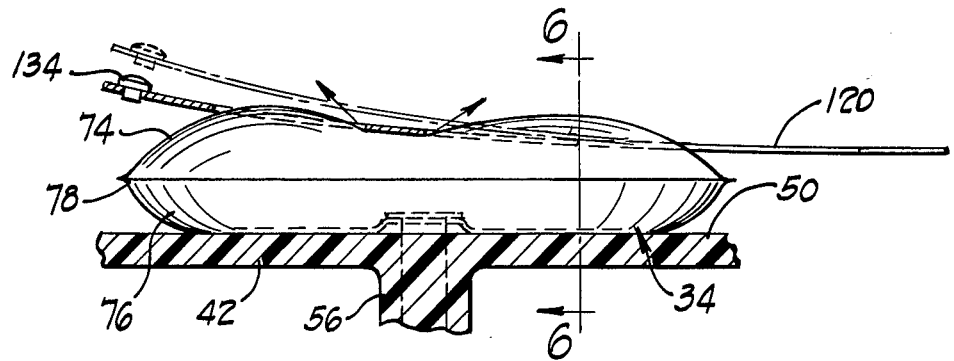
FIG. 5 is a schematic illustration of a portion of a device shown in FIG. 2.
Figure 6:
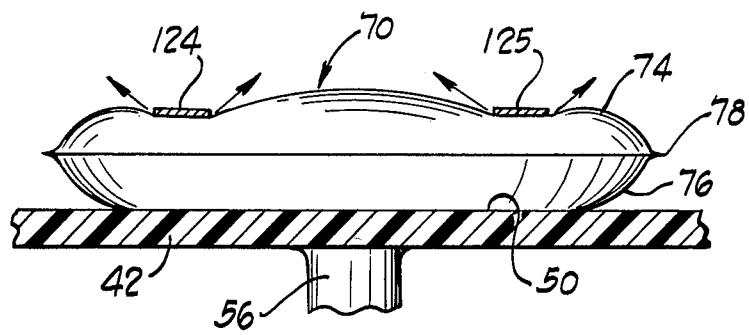
FIG. 6 is a cross-sectional view seen approximately from the plane indicated by the line 6—6 of FIG. 5; and, FIG. 7 is an enlarged cross-sectional view of a portion of the device of FIG. 2.

Referring to FIGS. 2, 5 and 6, the control member mounting legs 124, 125 and the strut 132 define substantial areas confronting the bladder 70 so that when the bladder engages the control member 120 the pressure within the bladder is exerted over the area of the control member which is engaged by the bladder. When a differential pressure is initially sensed the bladder 70 is expanded to the position generally shown in FIG. 3. The bladder is extremely lightly engaged between the member 120 and the reaction face 50. The member 120 resiliently deflects very slightly because of its engagement by the bladder 70 and the position of the member 120 stabilizes so long as no further differential pressure increases are sensed.

Assuming that the sensed differential pressure increases, the bladder 70 is inflated further resulting in the bladder 70 engaging the legs 124, 125 and the strut 132 over a substantially increased contact area (see FIG. 5). The increasing area of engagement occurs because of the "slack" nature of the bladder and its general configuration and in spite of the member 120 being deflected further away from its initial position. Because the member 120 is engaged over an increasingly large area of contact by the bladder and because the pressure differential across the bladder likewise increases as the area of contact increases the coaction between the bladder and the control member 120 effectively provides for a multiplication of the available actuating force.

In addition to the force multiplication effect, the relative slackness of the bladder material permits the bladder to "billow," or bulge, through the open areas of the member 120 and exert supplemental albeit small actuating forces on the control member. The bladder wall 74 bulges through the plane of the member 120 (see FIGS. 5 and 6) with the shapes of the bulges being generally arcuate. To the extent that the bladder material is tensioned, the tensile forces (indicated by arrows, FIGS. 5 and 6) in the bladder material are directed tangent to the bladder curvature and thus tend to actuate the member 120 toward engagement with the member 122. These forces are small compared to the differential pressure forces exerted on the member 120 but they nevertheless contribute towards actuation of the switch unit 35.

Actuation of the member 120 by the bladder 70 is further accompanied by an amplification effect in the displacement of the projecting end of the member 120. Since the actuating force applied to the member 120 by the bladder 70 is distributed over a substantial length of the member 120 the member 120 is deflected all along the area of application of the actuating force. Hence the only location along the member 120 which is not resiliently deflected is that portion of the member 120 which projects beyond contact with the bladder 70. The progressively increasing amounts of deflection of the control member 120 tend to maximize the travel of the contact element 134 for a given sensed differential pressure level.

When a predetermined differential pressure level has been applied across the bladder 70 the control member 120 flexes from its initial position to engage the contact member 122 so that the switch unit 35 conducts. In the preferred embodiment of the invention the contact member 122 includes a base section 140 anchored to the housing body 42 by a suitable fastener, a projecting cantilever arm section 142, and a bridging section 143 extending between the base and arm sections. The arm section 142 supports a contact element 144 at its projecting end and when the member 120 is deflected sufficiently the contact element 134 at the end of the member 120 engages the slides on the contact element 144.

The switch unit 35 is constructed and arranged so that the control device 20 can be installed in various orientations without substantially effecting the differential pressure level at which the switch unit 35 is actuated. As is best illustrated by FIG. 2 of the drawings the cantilever arm section 142 includes an enlarged tip portion at its projecting end and a relatively narrow deflectable spring portion between the bridging section 143 and the tip portion. The shapes and sizes of the tip and spring portions are such that the deflection of the arm section 142 under the influence of gravity forces is essentially the same as the deflection of the control member 120 by the same forces. Hence no matter which way the device 20 is orientated with respect to gravity, the gravity forces applied to the members 120 and 122 cause them to deflect substantially equally. The contact elements 134, 144 thus remain spaced apart a constant distance and the setting of the control is virtually unaffected.

When changing the differential pressure level to which the device 20 responds is desirable, the contact member adjusting mechanism 123 is operated to change the initial spacing between the contacts. In a preferred and illustrated embodiment of the invention, the mechanism 123 is constructed and arranged to enable relatively fine positioning of the contact member 122 quickly and easily. As shown by FIG. 3, the contact member base section 140 and the arm section 142 extend generally parallel to each other and the bridging section 143 extends between them making a small obtuse included angle with each. The housing body 42 has a tapped opening 160 extending through it into the recess 44 with the axis of the opening extending perpendicularly to the plane of the base section 140. The bridging section 143 extends partly across the opening making a small acute included angle with the axis. An adjusting screw 166 is threaded into the opening for movement along the axis and the projecting end of the screw engages a plastic sheath 170 (FIG. 3) which extends along the bridge section 143. When the screw is advanced into the opening the bridging section is resiliently deflected toward a position in which it is normal to the base section 140 and the contact element 144 is moved away from the contact element 134 to increase the differential pressure level to which the control device responds. When the screw is retracted the bridging section 143 is resiliently inclined further across the axis and the contact elements are moved closer together so that the device 20 responds to a lower level differential pressure.

Relatively fine manual adjustment of the device setting is accomplished quickly and easily. The driving end of the screw is accessible for turning by an ordinary screw driver externally of the housing assembly 30. The screw and the plastic sheath have basically a worm and gear relationship with a substantial amount of turning motion of the screw accompanied by a relatively small amount of relative motion of the contact elements. The screw threads are preferably relatively fine so that precise adjustment of the device setting can be easily achieved.

The construction of the control switch unit 35 is such that ambient temperature changes do not materially affect its "setting." Referring to FIGS. 3 and 4 it can be seen that the housing body portion to which the control member 120 is attached is considerably thicker than the housing body portion to which the switch arm 120 is attached (measured, for example, from the plane of the reaction surface 50). When ambient temperature changes alter the temperature the plastic housing body material, the material expands or contracts (depending on the direction and extent of the ambient temperature change) and the mounting location of the member 120 is shifted a greater distance relative to the plane of the surface 50 than is the mounting location of the member 122.

This differential shifting of the mounting locations tends to cause the contact element 134 to be displaced toward or away from the location of the contact element 144. If the ambient temperature increases the element 134 tends to shift toward the element 144 and if the temperature decreases the element 134 tends to shift away from the element 144. The extent of contact shifting caused by normally expectable ambient temperature variations can, if not compensated, cause an appreciable, and undesirable, change in the differential pressure level responded to by the device 20.

The mechanism 123 functions to compensate the switch unit 35 for such ambient temperature changes. When the adjusting screw temperature changes, the perimeter of the screw 166 shifts in a direction generally transverse to the direction of extent of the bridging section 143. This results in the contact element 144 being shifted toward or away from the contact element 134. The extent of the transverse shifting of the screw perimeter, while small compared to the extent of the relative shifting between the members 120, 122, is amplified by the deflection of the member 122. As a result, the displacement of the contact element 134 caused by a ambient temperature changes is closely matched, in direction and extent, by the temperature responsive displacement of the element 144.

In the preferred embodiment of the invention, motion of the projecting end of the switch member 122 is damped to prevent the member 122 from vibrating substantially. The mass and spring systems provided by the tip and arm sections of the member 122 can vibrate substantially if the device 20 is connected to equipment which imparts vibrational forces to the housing 30. Vibrations of the contact member 122 can result in undesirable chattering of the contact elements 134, 144 as the switch unit 35 approaches its closed condition. A damper element 180 (see FIG. 3) formed by a piece of yieldable foam plastic material is disposed between the housing assembly 30 and the projecting tip of the contact member 122 to dampen the vibrations. The illustrated damper 180 is fixed to the cover plate 54 by a suitable adhesive and lacks the structural strength to interfere materially with position changes of the member 122.

The control member 120 and the contact member 122 are electrically connected between the controller unit 36 and a grounded terminal 182 of the control device so that when the members 120, 122 are engaged an energizing circuit for the controller 36 can be completed through the members 120, 122.

The controller unit 36 may be of any suitable or conventional construction. In the embodiment of the invention illustrated by FIG. 2 the controller unit 36 is formed by a snap acting microswitch 200 and a switch operator 202 both of which are disposed in the housing assembly 30. The microswitch 200 initiates operation of the defroster 18 when actuated by the operator 202. The operator 202 in in turn controlled by the switch unit 35.

The microswitch includes the usual operating button 204 which controls the position of the snap switch contacts. The microswitch contacts are connected between terminals 206, 208 which are carried by the housing assembly 30 and form part of an energizing circuit for the defroster 18. When the button 204 is depressed by the operator 202 the microswitch contacts close to initiate operation of the defroster 18.

The operator 202 can be of any suitable or conventional construction and for the purposes of this description is a heat motor which actuates the microswitch under control of the switch unit 35. The heat motor is formed by an operating arm 220 supported by a pivot assembly 222 which is driven by a bimetal blade 224 and associated blade heater 226.

The blade 224 is fixed to the pivot assembly at one end and engages the housing assembly at is projecting end so that when the blade 224 warps due to differential expansion or contraction of its component metals the pivot assembly and the operating arm are moved. The blade heater 226 is preferably formed by heater wires wound on the bimetal blade and the illustrated heater is energized from alternate power supplies via terminals 230, 232 through a circuit connected to ground through the switch unit 35 and the ground terminal 182.

Whenever the switch unit 35 is in its conductive condition a heater energizing circuit is established through the control switch unit 35 so that the bimetal blade is heated in accordance with the electrical power passing through the heater and the length of time the control switch 35 is closed. When the bimetal blade is heated sufficiently, it moves the pivot assembly 222 and the operating arm 220 to depress the microswitch operator button to initiate operation of the defroster 18.

While a single embodiment of a preferred form of the invention is illustrated and described herein in considerable detail the present invention is not to be considered limited to the precise construction shown. Various adaptations, modifications and uses of the invention may occur to those skilled in the art and the intention is to cover all such adaptations, modifications and uses which fall within the scope or spirit of the appended claims.

What is claimed is:

1. A differential pressure responsive control device comprising:
   (a) a support housing;
   (b) a control switch member supported by said support housing and movable relative to said housing between first and second positions, said member defined by a thin sheet of electrically conductive material cantilevered to said housing and resiliently deflectable between said positions, said member biased toward said first position;
   (c) a bladder operatively interposed between said member and said housing to effect movement of said member to said second position from said first position, said bladder formed at least in part by supple film material and constructed and arranged to be inflatable up to a predetermined volume without resiliently deforming the film material;
   (d) conduit means for communicating the interior of said bladder to a source of fluid so that the bladder is inflated toward said predetermined volume when the fluid pressure level in said bladder exceeds the pressure ambient said bladder;
   (e) said member defining a major face confronting said bladder and said supple film material of said bladder engaging and conforming to said member face so that differential pressure force is applied to said member for moving said member to said second position when the volume of said bladder is substantially less than said predetermined volume.

2. The device claimed in claim 1 wherein said bladder engages said member over a contact area which increases in size as said bladder inflates.

3. The device claimed in claim 1 wherein said conduit means comprises a tubular body and said bladder includes a wall defining an aperture through which said tubular body extends, said conduit means further comprising an element engageable with said bladder about said aperture for clamping said bladder against said housing assembly.

4. The device claimed in claim 1 wherein said control switch member forms a moving contact of a switch unit, said switch unit including a switch arm mounted cantilever fashion to said support housing, said switch arm defining a spring section and an enlarged tip section.

5. The device claimed in claim 4 further including adjusting means for controllably varying the position of said switch arm relative to said control switch member to adjust the differential pressure level at which said switch arm is engaged by said member.

6. A control device responsive to differential fluid pressure comprising:
   (a) a support housing assembly defining a chamber portion;
   (b) control switch means in said chamber portion comprising:
      (i) a first switch element cantilevered to said housing and movable from a first position to a second position relative to said housing in response to sensed differential pressure, said first element biased toward said first position;
      (ii) a second switch element disposed in said housing for engagement by said first switch element in one of said positions; and,
   (c) an actuator for said switch means comprising a bladder formed at least in part by a supple film of material disposed in said chamber for effecting movement of said first switch element from said first position, said bladder changing volume in response to changing fluid pressure differentials between its interior and exterior and defining a bladder wall portion of said supple film material which is engageable with and conforms to said first switch element over a contact area which increases in size in direct relation to increases in the differential fluid pressure.

7. The control device claimed in claim 6 wherein said bladder is formed by confronting sheets of said film material sealed together about their peripheries to define a peripheral edge disposed in said chamber portion and freely movable relative to said housing assembly.

8. The control device claimed in claim 7 wherein said bladder sheets are composed of ethylene vinyl acetate plastic having a thickness of about 0.00125 inches.

9. The control device claimed in claim 6 wherein said first switch element is formed by a thin sheet of spring material defining at least a sheet-like mounting leg extending along said bladder for engagement by said bladder wall portion.

10. A differential pressure responsive control device comprising:
  (a) a support housing defining a reaction surface portion;
  (b) a control member comprised at least in part of a sheet-like material supported by said support housing and resiliently deflectable relative to said reaction surface portion between first and second positions, said control member self-biased toward said first position and providing a major surface area confronting said reaction surface;
  (c) a bladder interposed between said control member and said reaction surface portion to effect movement of said control member to said second position, said bladder defining a flattenable bag-like structure having a periphery disposed between reaction surface and said control member which is unrestrained against movement relative to said housing; and
  (d) conduit means for exposing said bladder to differential fluid pressure for inflating said bladder;
  (e) said bladder defining a first wall defined at least in part by a supple film material for directly engaging and conforming to said major surface of said control member and transmitting pressure forces of the fluid in said bladder to said major surface via said film material and a second, opposed wall for directly engaging said reaction surface, said first wall engaging said major surface over a contact area which increases as the control member is deflected from said first to said second position.

* * * * *